United States Patent [19]

Mosig et al.

[11] Patent Number: 4,809,665
[45] Date of Patent: Mar. 7, 1989

[54] FUEL SUPPLY SYSTEM FOR AN AUXILIARY MOTOR VEHICLE HEATING DEVICE

[75] Inventors: Ernst Mosig, Iffeldorf; Michael Nothen, Dietramszell, both of Fed. Rep. of Germany

[73] Assignee: Webasto AG Fahrzeugtechnik, Gauting, Fed. Rep. of Germany

[21] Appl. No.: 127,430

[22] Filed: Dec. 2, 1987

[30] Foreign Application Priority Data

Dec. 22, 1986 [DE] Fed. Rep. of Germany ........ 3643806

[51] Int. Cl.⁴ .............................................. B60H 1/22
[52] U.S. Cl. .................................... 123/514; 123/516; 123/497
[58] Field of Search ............... 123/514, 516, 497, 447, 123/510

[56] References Cited

U.S. PATENT DOCUMENTS

| 2,599,699 | 6/1952 | Dilworth et al. | 123/514 |
| 3,412,718 | 6/1967 | Long | 123/497 |
| 4,432,329 | 2/1984 | Redele | 123/516 |
| 4,703,736 | 11/1987 | Atkins | 123/516 |

FOREIGN PATENT DOCUMENTS 2327830 12/1974 Fed. Rep. of Germany .

Primary Examiner—Willis R. Wolfe
Assistant Examiner—M. Macy
Attorney, Agent, or Firm—Sixbey, Friedman, Leedom & Ferguson

[57] ABSTRACT

A fuel supply system for an auxiliary vehicle heating device to which fuel can be supplied via the fuel supply system of an internal combustion engine. A fuel storage reservoir is provided which supplies fuel to an auxiliary vehicle device, and is arranged in the engine compartment of the vehicle. The storage reservoir is filled with fuel in a batchwise manner from any vehicle-contained fuel supply source, preferably via an elongated slot opening into a fuel receiving space of the reservoir from a fuel line that is in bypassing relationship to the reservoir. The fuel storage reservoir has a ventilating value leading to the atmosphere. In accordance with one aspect of the inventive concept, the fuel storage reservoir can receive a fuel pump which forwards the fuel from the fuel storage reservoir to the auxiliary heating device, so that the pump and reservoir form a single-part unit. If desired, draining devices and/or heating units can be provided in the fuel storage reservoir in order to ensure a reliable operation of the auxiliary heating device, even at low temperatures.

18 Claims, 3 Drawing Sheets

1

FUEL SUPPLY SYSTEM FOR AN AUXILIARY MOTOR VEHICLE HEATING DEVICE

BACKGROUND AND SUMMARY OF THE INVENTION

This invention relates to fuel supply system for an auxiliary motor vehicle heating device (which operates independently of the vehicle engine and can be used to preheat the vehicle or engine before occupancy, or to warm a sleeping compartment while the vehicle is at rest and the engine turned off), having a fuel storage reservoir which can be filled from the fuel supply for the vehicle's internal combustion engine; More particularly, a fuel supply system wherein a fuel pump is provided for supplying fuel to the heating device from the fuel storage reservoir.

A fuel supply device of the initially mentioned kind is described in German Offenlegungsschrift No. 23 27 830, wherein an intermediate reservoir is disposed as a fuel storage reservoir in the return line leading away from the internal combustion engine toward the motor vehicle fuel tank. The overflow side of the intermediate reservoir is connected with the fuel tank of the motor vehicle, and furthermore, a ventilation line is provided at the intermediate reservoir which permits ventilation and overflow drainage via the tank of the motor vehicle. In this arrangement, the fuel flows continuously from the return side of the combustion engine through the intermediate reservoir and passes back to the fuel tank via the return line once the intermediate reservoir has been filled to capacity. A metering nozzle, serving as a fuel supply device to the heating unit, is connected with the outlet line of the intermediate reservoir.

The cost of installing fuel supply device for an auxiliary vehicle heater is very high since several lines and line branches have to be provided at the point of separation to the fuel supply unit of the internal combustion engine. Furthermore, depending upon the vehicle fuel tank design, ventilation and overflow drainage of the intermediate reservoir can lead to problems, particularly when the engine is standing still.

Accordingly, it is a primary objective of the invention to provide a fuel supply system for an auxiliary fuel heating device which overcomes the difficulties described above by permitting a reliable and largely degassed fuel supply to the auxiliary vehicle heating device from the fuel supply equipment for the vehicle engine, and which, in a simplified manner, can be installed into the vehicle with a minimum of installation time.

In accordance with the invention, a fuel supply device for an auxiliary vehicle heating system is characterized in that the fuel storage reservoir is arranged in the engine compartment of the vehicle, and is filled with fuel in a batchwise manner from any desirable fuel supply unit of the internal combustion engine, and in that a ventilating valve, leading to the environment, is provided at the fuel storage reservoir.

In the fuel supply system of the present invention, the fuel storage reservoir has a separate ventilating device, formed by a valve, so that the supply of fuel to the auxiliary vehicle heating device from the fuel storage reservoir is independent of, respectively, a connection with, or a corresponding ventilation by the fuel tank of the vehicle. Accordingly, the respective design of the motor vehicle's tank does not have to be a consideration for the installation of the inventive fuel supply device.

Even if gas bubbles should form in the fuel supply device of the internal combustion engine, they will not have an adverse effect on the fuel supply of the heating device inasmuch as the fuel supply reservoir in the inventive device simultaneously serves as a separator for gas bubbles.

Advantageously, a fuel pump is arranged in the fuel supply device and is surrounded by the fuel in the fuel storage device so that the pump is constantly cooled by the fuel and consequently can reliably supply fuel to the heating device. As the fuel storage reservoir already contains filtered fuel, and the fuel pump is arranged in the fuel storage reservoir, it is also very effectively protected against contamination.

In order to permit a filling of the fuel storage reservoir, a line having a longitudinal slot-like passage to the interior of the fuel storage reservoir can be provided at the outside of the reservoir and at the height of the reservoir fill level, thereby enabling flow in the line to bypass the reservoir when it is full. In order to have the widest choice regarding the installation of the fuel supply reservoir, positioning of the fuel pump relative to the fuel supply device is appropriately coordinated.

In accordance with a further aspect of the invention, the intake for the fuel pump is designed to be incorporated within the fuel storage reservoir so that the pump and reservoir can be handled as a single unit that can be inserted at the fuel consumption point of the fuel supply device of the vehicle's internal combustion engine and can be connected with the auxiliary motor vehicle heating device.

In order to ensure a space-saving design of the fuel supply reservoir, for installation purposes, its outer dimensions are adapted to the contour of the vehicle heating device.

A drainage unit can be provided in the fuel storage reservoir to reduce the danger of the fuel pump freezing at very low temperatures. Alternatively, or additionally, a fuel heating device can be provided in the fuel storage reservoir, whereby a gelatinizing of the fuel in the fuel storage reservoir is avoided, and when using diesel fuel, it is heated to achieve sufficient pumpability.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1A:
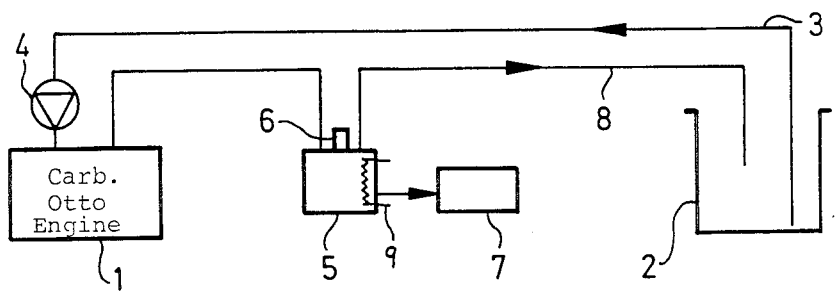
FIGS. 1a to 1c are schematic views of fuel supply devices for auxiliary motor vehicle heating devices illustrating various manners in which they may be installed into the fuel supply unit of an internal combustion engine of a motor vehicle.

In the drawings and following description identical or similar parts are designated by the same reference numeral, but with primes (') being used to differentiate modified parts.

Figure 1B:
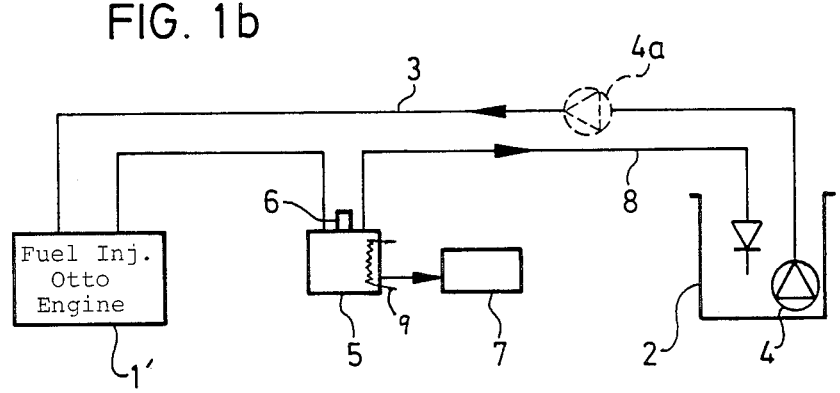
Figure 1C:
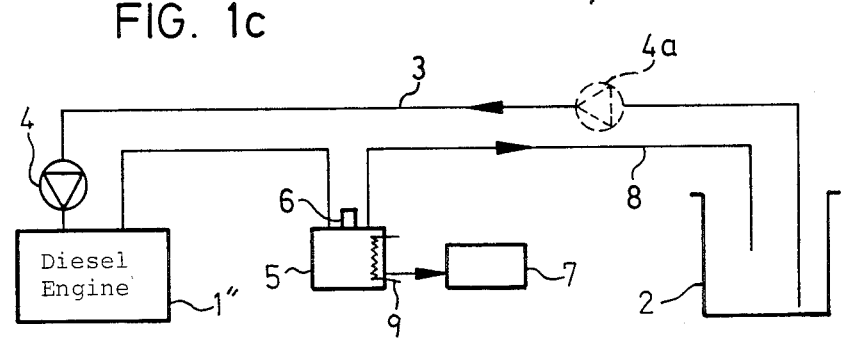

FIGS. 1a to 1c depict preferred modes of installing the inventive fuel supply device.

FIG. 1a depicts, as an example of an internal combustion engine, an Otto engine which has a carburetor (not shown). The fuel supply device of internal combustion engine 1 comprises a tank 2, which is connected with a carburetor of internal combustion engine 1 via a feed line 3 and a fuel pump 4.

The vehicle-contained fuel supply unit additionally has a return line 8 leading from the carburetor of the internal combustion engine 1 to tank 2. In the example given, the return line 8 is divided into two sections and the fuel line connector of storage reservoir 5, in accordance with the invention, is arranged in the main flow of the return line. That is, the section of line 8 originating from the carburetor of internal combustion engine 1 communicates with the inlet of the fuel line connector of the fuel storage reservoir 5, and the outlet of this fuel line connector communicates with the section of line 8 leading to tank 2. The auxiliary motor vehicle heating device 7 is supplied with fuel via an outlet from the interior storage space of fuel storage reservoir 5.

FIG. 1b depicts an internal combustion Otto engine 1' which has a fuel injection system. A second fuel pump 4a, indicated by broken lines, can be provided in addition to the fuel pump 4 in tank 2 or in place thereof. This fuel supply unit of the internal combustion engine 1' comprises, as in the previous example, a feed line 3 and a return line 8. The fuel storage reservoir 5 is arranged in the main flow of return line 8, in a manner which is similar to that in the example of FIG. 1a, whereby an auxiliary vehicle heating device 7 is supplied with fuel from fuel storage reservoir 5.

FIG. 1c depicts an example of a diesel internal combustion engine 1'' as well as the fuel supply unit coordinated thereto. This fuel supply device also comprises a feed line 3 and a return flow line 8 as well as a minimum of one fuel pump 4. Additionally, a fuel pump 4a may be provided upstream of the first fuel pump 4 in feed line 3. In this example also, the inventive fuel storage reservoir 5 is disposed in the main flow of return line 8, i.e., similar to the example in FIGS. 1a and 1b, and an auxiliary vehicle heating device 7 is supplied with fuel by fuel storage reservoir 5.

Figure 2:
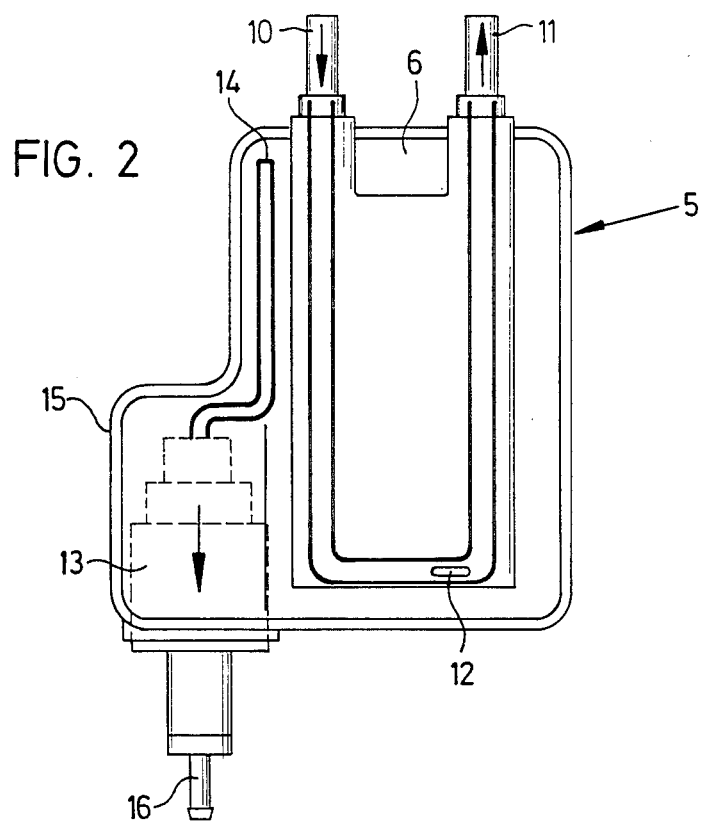
FIG. 2 is a top view of an embodiment of a fuel storage reservoir of a fuel supply device for an auxiliary motor vehicle heating device.
Figure 3:
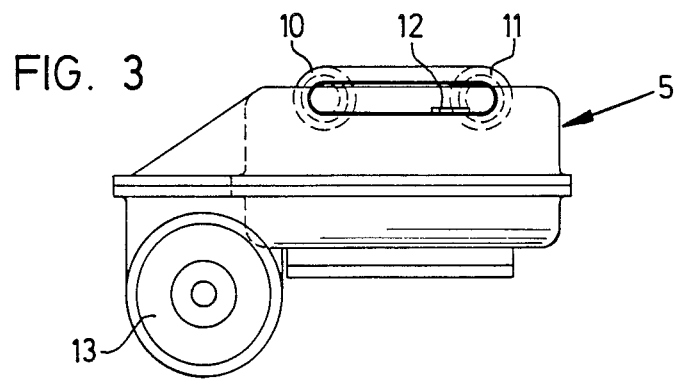
FIG. 3 is a side view of the fuel storage reservoir of FIG. 2.

FIGS. 2 and 3 describe a first embodiment of the fuel storage reservoir 5, schematically indicated in FIGS. 1a to 1c. As indicated in FIG. 2, an inlet 10 and an outlet 11 of a fuel line connector of the fuel storage reservoir 5 are provided for connecting with a corresponding section of line 8 of the fuel supply device, of an internal combustion engine 1, 1', 1'' (not depicted in FIGS. 2 and 3). The solid lines between the inlet and outlet arrows in FIG. 2 depict the fuel flow from inlet 10 to outlet 11 of the fuel storage reservoir 5. From outlet 11, fuel subsequently returns to the fuel supply unit of internal combustion engine 1, 1', 1'', e.g., tank 2. Furthermore, at an elevated point on fuel storage reservoir 5, an opening 12 is provided in the fuel line passing through fuel storage reservoir 5 (see solid lines) and through which opening fuel is supplied into the interior storage space of the fuel storage reservoir 5 in batchwise amounts. This means that fuel only enters the interior of fuel storage reservoir 5 via opening 12 when the fill level of fuel storage reservoir 5 is lower than opening 12, and then, only at a controlled rate determined by a main fuel supply pump, which will prevent entry into the reservoir of gas bubble within the fuel line travelling directly to the fuel tank 2 from the engine 1, 1', 1'' (i.e., by passing the interior of reservoir 5 within the fuel line segment formed by the connector), and thereby prevent such bubbles from adversely affecting pumping of fuel to the heater 7. When the fuel storage reservoir 5 has emptied, it is refilled with fuel via opening 12 up to the point where the fill level is at the height of opening 12.

Furthermore, in accordance with the design of the fuel storage reservoir 5, depicted in FIGS. 2 and 3, a fuel pump 13 is in communication with the interior of fuel storage reservoir 5 via reservoir discharge pipe 14. In the example shown, fuel pump 13 is arranged in a part of the actual fuel storage reservoir 5, being disposed in the bulged portion 15, and is continuously surrounded by the fuel in the fuel storage reservoir 5, the bulged portion positioning the pump below a bottom wall of the main body of the reservoir 5 as shown in FIG. 3. The discharge direction of the fuel pump 13 is indicated by an arrow, and the pump's outlet leads to the auxiliary motor vehicle heater 7 (not depicted in FIGS. 2 and 3) for the purpose of supplying it with fuel from the fuel storage reservoir 5. Furthermore, a ventilating valve 6 is provided in the fuel storage reservoir 5, which valve communicates with the interior space of fuel supply reservoir 5 containing the fuel storage supply. Ventilating valve 6 enables evacuation of gases and vapors produced by the fuel from the interior of the fuel storage reservoir, and by allowing air to bleed back into the interior fuel storage space, prevents the creation of a negative pressure which would inhibit the the release of fuel to fuel pump 13, which subsequently supplies the fuel to auxiliary heating device 7.

As can be seen from FIG. 3, in particular, the shape of fuel storage reservoir 5 is adapted to the outer contours of a heating device, so that the fuel storage reservoir can be installed in a space-saving manner at the auxiliary vehicle heating device, which preferably is installed into the engine compartment of the vehicle. As can be seen, the fuel pump 13 is inserted from the outside into the housing element provided, i.e., the bulging element 15 of storage reservoir 5, and then is secured via a flanged connection so that a common housing is supplied for both the fuel storage reservoir 5 and for the fuel pump 13, which advantageously is designed as a single-unit part.

The type of fuel storage reservoir 5 in accordance with FIGS. 2 and 3 employs a casting.

Figure 4:
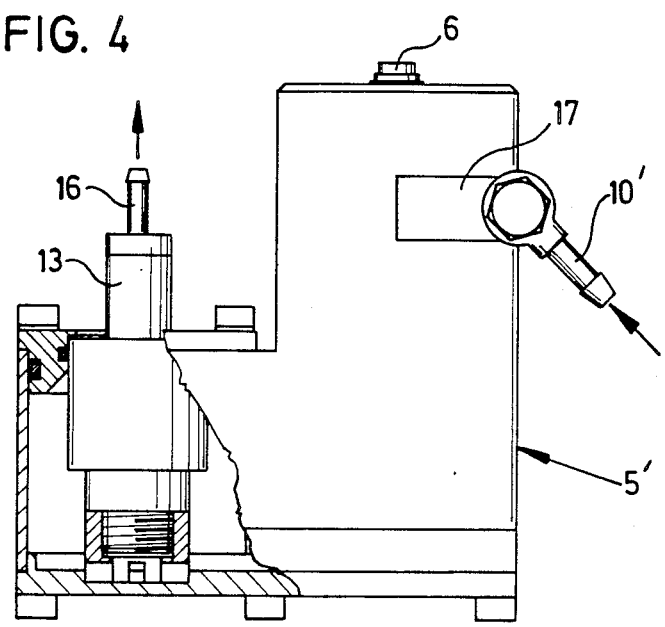
FIG. 4 is a side view, partially in section, of another embodiment of a fuel storage reservoir of a fuel supply device for an auxiliary vehicle heating device.

FIG. 4 shows a fuel storage reservoir 5' which has the fuel pump 13 attached in a vertical orientation in such a way that the fuel pump 13 is continuously surrounded with fuel from the fuel storage reservoir 5'. On the side which is to the right in FIG. 4, inlet 10' of the fuel storage reservoir 5' is located adjacent to a passage 17, which passage essentially has the same function and structure as does the passage with the opening 12 of the embodiment depicted in FIGS. 2 and 3. Here, too, the interior of the fuel storage reservoir 5 is filled in batchwise amounts from a line containing fuel traveling from the engine to its fuel storage system as it travels across the opening 12 after having entered the fuel line segment formed by the fuel line connector via its inlet 10'.

Figure 5:
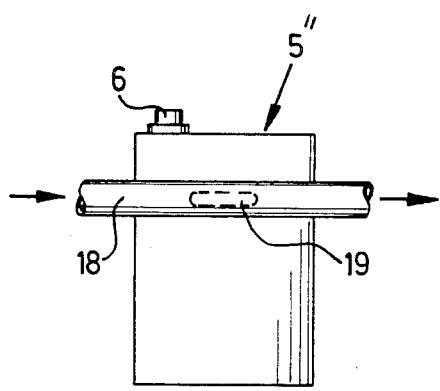
FIG. 5 is a schematic view of another embodiment of a fuel storage reservoir.
Figure 6:
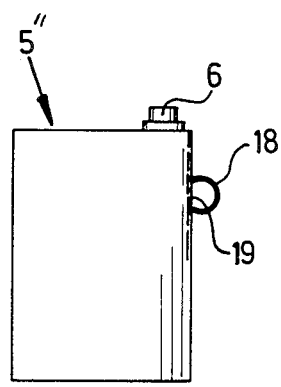
FIG. 6 is a side view of the fuel storage reservoir according to FIG. 5.

FIGS. 5 and 6 schematically depict another embodiment of the fuel storage reservoir which, like those described above, has a ventilating valve 6, but which does not have a built-in fuel pump 13, i.e., relies on an external pump or a pump of the heating device to withdraw fuel from reservoir 5 for use by the heater 7. For the purpose of providing fuel supply via a flow line in bypassing relationship to fuel storage reservoir 5″, a line section 18, having an elongated slot 19, is provided. Line section 18 extends at the height of the fill level of the interior space of fuel reservoir 5″. This line section 18 is secured to the out side of the fuel storage reservoir 5″ and is connected to the fuel supply device of the internal combustion engine in the manner described by way of FIGS. 1a to 1c. The inner space of fuel storage reservoir 5″ is filled with fuel bled off from line section 18 via elongated slot 19 as the main flow of fuel bypasses the reservoir 5″.

Although not depicted in detail, a draining means may be provided in fuel storage reservoirs 5, 5′, 5″ to prevent freezing of the fuel pump at low temperatures. Also, fuel heating devices (depicted only schematically in FIGS. 1a–1c at 9) may be provided in fuel storage reservoirs 5, 5′, 5″ to eliminate gelatinizing of the fuel therein at low temperatures. This is particularly important when using Diesel fuel, for which the heating process ensures a sufficient pumpability at all times.

The above description of the preferred embodiments makes it clear that the usage of the inventive fuel storage reservoir 5, 5′, 5″ provides the auxiliary vehicle heating device 7 with fuel without requiring ventilating via a device on the vehicle's fuel tank 2. Accordingly, the design configuration of tank 2 does not have to be taken into account in connection with the installation of the inventive fuel storage reservoir. Inasmuch as this reservoir, itself, promotes a gas separation, the delivery performance of fuel pump 13 is enhanced, and a more uniform fuel supply to the auxiliary vehicle heating device is facilitated in this manner, and inherently, the operating performance of the auxiliary vehicle heating device 7 is improved.

If, for instance, as is the case in the examples according to FIG. 4 and also according to FIGS. 2 and 3, the fuel pump 13, coordinated to fuel storage reservoir 5, 5′, is continuously surrounded by fuel in the interior thereof, the fuel pump 13 is continuously cooled, thereby causing its delivery performance to become more uniform and inherently, improved. Another advantage of the inventive design is that the fuel pump 13 is disposed in a way which provides protection against contamination, as the fuel contained in the fuel storage reservoir 5, 5′ has already passed the filter elements of the fuel supply system of internal combustion engine 1. It is to be understood that the arrangement of the fuel pump 13 in or at the fuel storage reservoir 5, 5′ can be in any position between horizontal and vertical, in order to avoid the need for a special preferred installation position for fuel storage reservoir 5, 5′. Instead, options regarding its installation can be freely exercised based on the space conditions at hand.

The size of the fuel storage reservoir 5, 5′, 5″ may vary depending upon the desired fuel storage volume. In a similar manner, design variations of the fuel storage reservoir, other than those depicted in the drawings, are possible. Specifically, single and/or multiple features of the fuel storage reservoirs 5, 5′, 5″ may be combined.

With regard to ventilation valve 6, it can be built into a receptacle that is provided in the housing of the fuel storage reservoir 5, 5′, 5″ and may be a ball retaining type valve. It is also to be understood, however, that structure of the ventilation valve, per se, is not part of the invention and any conventional valve known for use in venting gases from a liquid filled container may be used.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Fuel supply system for an auxiliary motor vehicle heating device having a fuel storage reservoir which can be filled via a fuel supply source of an internal combustion engine of a vehicle, and a fuel pump for supplying fuel from the fuel storage reservoir to the heating device; wherein the fuel storage reservoir is arranged in the engine compartment of the motor vehicle; wherein the fuel storage reservoir is provided with a ventilating valve means for venting gases from an interior fuel storage space of the reservoir to the atmosphere; and wherein the fuel storage reservoir is provided with filling means transferring batchwise quantities of fuel from the fuel supply source of the vehicle into the fuel storage space of the fuel storage reservoir for the heating device.

2. Fuel supply system for an auxiliary motor vehicle heating device according to claim 1, wherein the fuel pump is arranged in the interior fuel storage space of the fuel storage reservoir at a position whereby fuel pump will be surrounded by fuel contained in said fuel storage space.

3. Fuel supply system for an auxiliary motor vehicle heating device according to claim 2, wherein said filling means comprises means for withdrawing fuel from a fuel line that is in bypassing relationship with respect to said fuel storage reservoir.

4. Fuel supply system for an auxiliary motor vehicle heating device according to claim 3, wherein said bypassing fuel line comprises a fuel line connector disposed at the height of the fill level of the fuel storage reservoir and secured to the fuel storage reservoir; and wherein said filling means comprises an elongated slot-like passage from said fuel line connector into the fuel storage space of the fuel storage reservoir.

5. Fuel supply system for an auxiliary motor vehicle heating device according to claim 1, wherein said filling means comprises means for withdrawing fuel from a fuel line that is in bypassing relationship with respect to said fuel storage reservoir.

6. Fuel supply system for an auxiliary motor vehicle heating device according to claim 5, wherein said bypassing fuel line comprises a fuel line connector disposed at the height of the fill level of the fuel storage reservoir and secured to the fuel storage reservoir; and wherein said filling means comprises an elongated slot-like passage from said fuel line connector into the fuel storage space of the fuel storage reservoir.

7. Fuel supply system for an auxiliary motor vehicle heating device according to claim 4, wherein a receptacle for the fuel pump is formed as part of a common housing for both the fuel storage space and the fuel pump.

8. Fuel supply system for an auxiliary motor vehicle heating device according to claim 7, wherein said receptacle positions said fuel pump lower than a bottom wall of the fuel storage space.

9. Fuel supply system for an auxiliary motor vehicle heating device according to claim 2, wherein a receptacle for the fuel pump is formed as part of a common housing for both the fuel storage space and the fuel pump.

10. Fuel supply system for an auxiliary motor vehicle heating device according to claim 9, wherein said receptacle positions said fuel pump lower than a bottom wall of the fuel storage space.

11. Fuel supply system for an auxiliary motor vehicle heating device according to claim 7, wherein a fuel heating device is disposed in the fuel storage reservoir.

12. Fuel supply system for an auxiliary motor vehicle heating device according to claim 6, wherein a fuel heating device is disposed in the fuel storage reservoir.

13. Fuel supply system for an auxiliary motor vehicle heating device according to claim 2, wherein a fuel heating device is disposed in the fuel storage reservoir.

14. Fuel supply system for an auxiliary motor vehicle heating device according to claim 1, wherein a fuel heating device is disposed in the fuel storage reservoir.

15. Fuel supply system for an auxiliary motor vehicle heater according to claim 1, wherein said fuel storage reservoir is in a fuel return line running from the vehicle engine to the fuel supply source therefor.

16. Fuel supply system for an auxiliary motor vehicle heater according to claim 3, wherein said fuel storage reservoir is in said fuel line and said fuel line is a fuel return line running from the vehicle engine to the fuel supply source therefor.

17. Fuel supply system for an auxiliary motor vehicle heater according to claim 4, wherein said fuel storage reservoir is in said fuel line and said fuel line is a fuel return line running from the vehicle engine to the fuel supply source therefor.

18. Fuel supply system for an auxiliary motor vehicle heater according to claim 6, wherein said fuel storage reservoir is in said fuel line and said fuel line is a fuel return line running from the vehicle engine to the fuel supply source therefor.

* * * * *